United States Patent [19]

Maillot

[11] 3,869,652

[45] Mar. 4, 1975

[54] METAL OXIDE DIELECTRIC LAYERS FOR CAPACITORS

[75] Inventor: Jean Paul Maillot, Saint-Berthevin-les-Lavai, France

[73] Assignee: International Standard Electric Corporation, New York, N.Y.

[22] Filed: Mar. 14, 1973

[21] Appl. No.: 341,184

[30] Foreign Application Priority Data
Mar. 15, 1972  France .............................. 72.08961

[52] U.S. Cl. ............................... 317/230, 317/260
[51] Int. Cl. ......................... H01g 9/05, H01g 3/17
[58] Field of Search ............................ 317/230, 260

[56] References Cited
UNITED STATES PATENTS
| | | | |
|---|---|---|---|
| 3,178,623 | 4/1965 | Robinson | 317/258 |
| 3,397,446 | 8/1968 | Sharp | 317/230 X |
| 3,588,999 | 6/1971 | Sasaki et al. | 317/230 X |
| 3,612,956 | 10/1971 | Sterling | 317/230 |

Primary Examiner—Stanley D. Miller, Jr.
Assistant Examiner—William D. Larkins
Attorney, Agent, or Firm—John T. O'Halloran; Menotti J. Lombardi, Jr.; Edward Goldberg

[57] ABSTRACT

A wound metallized capacitor includes a plastic support layer having an evaporated metal electrode layer such as of aluminum, a deposited metal oxide dielectric layer such as titanium dioxide or niobium dioxide, and a second metal electrode layer. A second metal oxide layer, such as manganese dioxide, may be deposited on the metal electrode before the primary dielectric layer. Various other dielectrics and deposition processes may be used. The metal electrodes are alternately spaced from opposite ends and joined at each end to form lead connections. The plastic layer is preferably of a high temperature type to withstand processing.

7 Claims, 6 Drawing Figures

PATENTED MAR 4 1975　　　　3,869,652

METAL OXIDE DIELECTRIC LAYERS FOR CAPACITORS

BACKGROUND OF THE INVENTION

1. Field of the Invention

The present invention relates to capacitors made by winding metallized dielectric sheets and, more particularly, to metal oxide dielectric layer capacitors.

2. Description of the Prior Art

It is generally known that the capacitance per volume unit or "specific capacitance" of a capacitor results from considerations given to optimum utilization of dielectric material characteristics, electrode areas, manufacturing technology and other electrical, mechanical and thermal size features.

Due to the fact that the capacitance of any type of capacitor is directly proportional to the dielectric material located between the two electrodes and inversely proportional to the dielectric thickness, it is desirable to use as thin a layer of dielectric as possible made of material having as high a dielectric constant as possible, in order to obtain a compact device.

However, there is a limitation occuring because of dielectric breakdown voltage and dielectric losses. Particularly, the breakdown of a given dielectric material layer depends on its dielectric strength and on properties such as the lack of impurities and certain defects, such as holes, pores and occlusions.

It is known that for a given operating voltage, the specific capacitance of aluminum electrolytic type capacitors is substantially higher than that of a metallized polypropylene foil capacitor. However, a high specific capacitance is not the only quality that may be required in a capacitor and metallized dielectric film capacitors are better than electrolytic capacitors in several respects. For example, they are more stable and reliable, have smaller loss angles and leakage current, and they are self-healing. This last quality is possibly the most important. The self-healing property is the process wherein after a local failure in its dielectric, the electric properties of a capacitor are instantaneously and substantially restored to values existing before the failure. It is noted that a metallized dielectric film capacitor is rarely short-circuited because, for a breakdown due to a dielectric failure, the energy generated by the capacitor discharged at the point of the failure is sufficient to vaporize the metal at the spot so that the capacitor is quickly restored to the initial characteristics.

The most commonly used electrolytic capacitors are those which utilize aluminum and tantalum. However, other materials may be used as, for instance, niobium and titanium, the dielectric being either the niobium oxide ($Nb_2O_5$) or titanium dioxide ($TiO_2$). Compared with alumina, those two materials have higher dielectric constants and strength for a given voltage. However, by the use of suitable manufacturing techniques wherein a dielectric is applied to an aluminum electrode of reduced electrode thickness and gap layer thickness, the specific capacitances are only slightly higher than those of common alumina electrolytic capacitors. A known chemical coating process wherein a titanium dioxide dielectric layer is formed on an aluminum anode of an electrolytic capacitor is described in U.S. Pat. No. 3,612,956 issued Oct. 12, 1971 and assigned to the same assignee as the instant application.

SUMMARY OF THE INVENTION

A primary object of this invention is therefore to provide a coiled capacitor of the self-healing metallized dielectric layer type which is stable, reliable and which has a specific capacitance higher than that of comparable electrolytic capacitors, and which utilizes as a dielectric a metal oxide having a high dielectric constant and high dielectric strength such as titanium dioxide.

According to a feature of this invention, the capacitor comprises a metal oxide dielectric layer applied to a first metallized-layer forming one of the electrodes which is evaporated onto a plastic insulation support compatible with the coating temperature, the other electrode being obtained by evaporating a second metallized layer onto the metal oxide dielectric layer.

According to another feature of this invention, the first metallized layer is produced by evaporating aluminum under vacuum conditions onto a plastic support resistant to temperatures reached during the following capacitor manufacturing steps. The dielectric layer is obtained by chemically coating the first metallized layer with a metal oxide such as titanium dioxide ($TiO_2$) or niobium oxide ($Nb_2O_5$).

According to another feature of this invention, when utilizing titanium dioxide, the first metallized layer is first coated with a manganese dioxide layer and then a titanium dioxide layer. The addition of such a material capable of providing oxygen is useful to insure that the titanium dioxide is perfectly "stoichiometric," so that its formula is exactly $TiO_2$ and not $TiO_x$, $x$ representing a number smaller than 2.

Other features of the present invention will appear more clearly from the following description of an embodiment, taken in conjunction with the accompanying drawings.

DESCRIPTION OF THE PREFERRED EMBODIMENTS

Figure 1A:
FIGS. 1a, b, c and d illustrate the sequence of coating processes to be made on the plastic supports, FIG. 2 schematically shows a cross-sectional view of a metallized dielectric capacitor according to this invention and, FIG. 3 illustrates the layered structure for a capacitor having a first manganese dioxide coating.

One of the purposes of this invention is to make a capacitor having a specific capacitance $\gamma$ higher than that of an electrolytic capacitor under the same operating voltage. It is to be noted that the thickness $e_1$, which in the described embodiment is that of the plastic support, since electrode thickness is negligible, must be such that;

$e_1 \leq \epsilon_0 g / V \gamma_o \epsilon\sigma$ wherein $\gamma o$ is the specific capacitance of the reference electrolytic capacitor, $\epsilon_o$ is the specific vacuum inductive capacity, $g$ is the ratio of useful electrode area to apparent electrode area, $\epsilon$ is the dielectric material constant, $\sigma$ is the dielectric strength in volts per unit of thickness, and V is the maximum operating voltage.

In the type of capacitor according to this invention, $g$ is equal to 1. In addition, taking into account their structure, the operating voltage may be close to the breakdown voltage. The product $\epsilon\sigma$ is equal to 12,000 V/$\mu$m for $TiO_2$ and to 14,000 for $Nb_2O_5$.

With the values: $V = 16$ volts and $\gamma_0 = 850$ $\mu F/cm^3$, the result
for $TiO_2$ is: $e_1 \leqslant 8$ m
and for $Nb_2O_5$: $e_1 \leqslant 9$ $\mu m$ In a same manner, with the values $V = 400$ volts and $\gamma_0 = 9.5$ $\mu F/cm_3$,
for $TiO_2$: $e_1 \leqslant 28$ $\mu m$
and for $Nb_2O_5$: $e_1 \leqslant 32$ $\mu m$.

Thickness of metal oxide dielectric to be deposited on the metallized layer are respectively, for
16 volts: 0.03 $\mu m$ for $TiO_2$
and: 0.04 $\mu m$ for $Nb_2O_5$
and 400 volts: 0.75 $\mu m$ for $TiO_2$
and: 1 $\mu m$ for $Nb_2O_5$.

The plastic insulation supports may be made in the form of films having a thickness of about 6 $\mu m$ of polyimide, polytetrafluorethylene, polyhydantoin, polysulfone, and poly-4-methyl-pentene, which are able to resist relatively high processing temperatures. When those temperatures are relatively low, more usual and less costly plastic supports of ethylene polyterephtalate, polypropylene and polycarbonate are usable.

With an insulation thickness $e_1$ of 6 $\mu m$ and taking into account a metal oxide dielectric thickness of 1 $\mu m$ ($TiO_2$) or 0.75 $\mu m$ ($Nb_2O_5$), with an operating voltage of 400 V, the capacitor of the present invention has a specific capacitance of four times higher than an electrolytic alumina capacitor, when using $TiO_2$, and five times higher with $Nb_2O_5$. Under the same conditions, but with an operating voltage of 16 V, the gain is smaller, being 1.2 and 1.3 respectively.

It is to be noted that the plastic insulation support must withstand the operating voltage since it is located in the electric field. All the above mentioned materials with a thickness of 6 $\mu m$ have dielectric strengths with typical breakdown voltages of from 100 V for polytetrafluorethylene to 750 V for polypropylene. Since polypropylene may be produced in the form of a thin film of 4 $\mu m$, the above mentioned gains using a polypropylene support may be:
5.5 for $TiO_2$ and 7 for $Nb_2O_5$ at 400 V, and
1.8 for $TiO_2$ and 2 for $Nb_2O_5$ at 16 V.

Figure 1B:
Figure 1C:

The successive metallizing and coating steps with a metal oxide dielectric on a plastic support will be better understood by considering FIG. 1a, wherein the cross-section of a plastic support sheet 1 has a thickness of a few $\mu m$. In the second step of FIG. 1b, the same plastic support is coated with a first aluminum layer 2 applied by a known vaporizaiton process under vacuum conditions. The next step is shown in FIG. 1c wherein there is a layer 3 of a metal oxide dielectric such as titanium dioxide, $TiO_2$, or niobium oxide, $Nb_2O_5$, produced by a chemical coating process over layer 2. The last step is shown in FIG. 1d wherein, a second aluminum layer 4 is applied to layer 3 by a known vaporization process under vacuum.

Figure 1D:
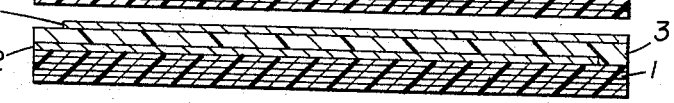

From FIG. 1d, it is noted that the first layer 2 starts from the left side of the plastic support 1 and stops at small distance from the right side. In the same manner the second layer 4 starts from the right side of layer 3 and stops at some distance from the left side, which features will be discussed further in connection with FIG. 2.

The processes used for applying the metal oxide dielectric layer 3 will now be described in greater detail. In the case of titanium dioxide, a suitable process uses a pyrolytic reaction in a vapor. The titanium dioxide is produced from a low temperature reaction wherein oxygen is mixed "in situ" with a reactant agent such as a titanium halogenate $TiCl_4$, for example. The layer producing operation includes mixing two streams of gas at the output of the nozzle, oxygen being carried in one stream and titanium tetrachloride in the other one. The nozzle output is located close to the plastic sheet coated with layer 2 and is moved for scanning from one side to the other while the plastic sheet is moved transversely. In this manner, a uniform titanium dioxide layer is formed on the sheet. The coating process is controlled both by the concentration and flow of the reactant gas streams.

During these steps, the sheet temperature must be maintained at about 200°C, which indicates the use of a plastic support material capable of withstanding that temperature, for instance, polyhydantoin, polytetrafluorethylene, polyimide, or polysulfone.

The layer 3 may also be made of oxides other than $TiO_2$ or $Nb_2O_5$ and, for each oxide, there is suitable coating process made at a given temperature which permits or excludes the use of a particular plastic support.

The following table shows some examples of materials that may be used:

| Metal Oxide dielectric | Coating process |
| --- | --- |
| $TiO_2$ | Pyrolysis of titanium tetrachloride |
| $Nb_2O_5$ | Pyrolysis of niobium pentachlorate |
| $Al_2O_3$ | Pyrolysis of an organic aluminum salt |
| $Zr\ O_2$ | Pyrolysis of zirconium chlorate |
| $Ta_2\ O_5$ | Pyrolysis of tantalum chlorate |
| $Hf\ O_2$ | Powdering in oxygen atmosphere |

Once the sheet has been made according to FIG. 1, it is wound in the form of a cylindrical capacitor having a circular or oval cross-section.

Figure 2:
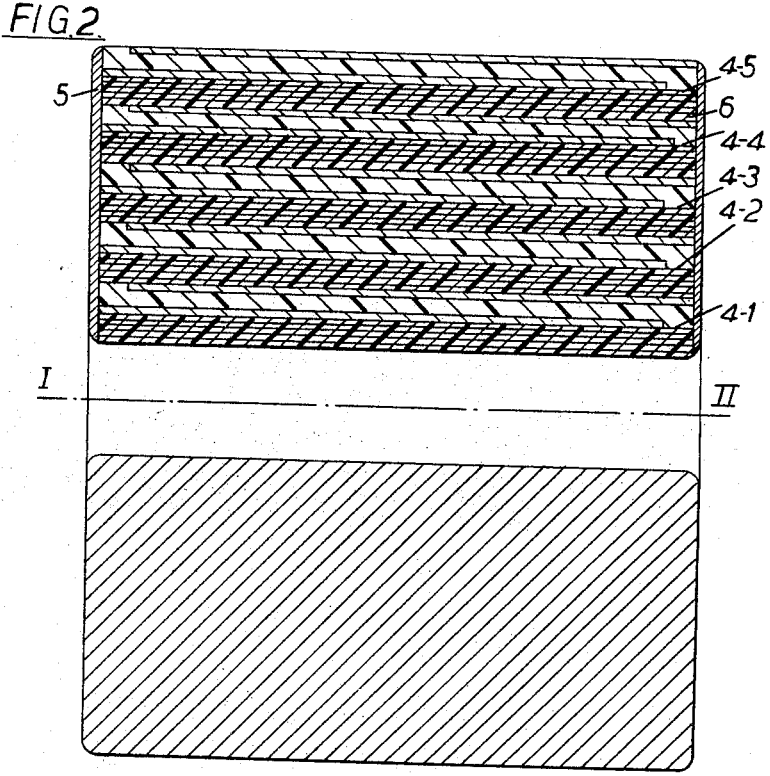

FIG. 2 schematically shows a partial cross-sectional view of the capacitor taken along a plane passing through axis I–II of the coil. Only a half of the cross-section has been shown in the upper part of FIG. 2. The structure includes five elementary wound layers, such as the one layer shown in FIG. 1d of the fully processed sheet, indicated by the reference numbers, 4–1, 4–2, 4–3, 4–4 and 4–5.

The next step includes applying powdered metal onto the opposite coil ends 5, 6, in FIG. 2. The metal applied to end 5 short-circuits all the coil turns of the first metallized layer 2 (shown more clearly in FIGS. 1b and 1d) which constitutes one of the electrodes and the metal applied to end 6 short-circuits all the coil turns of the second metallized layer 4 (FIG. 1d) which constitutes the other electrode. The two connecting leads of the capicitor are welded to these metal end coatings.

The capacitor is then regenerated by known processes of self-healing of the short circuit points and thereafter packaged. For certain applications, it may be useful to apply a layer of an oxygen providing material such as manganese dioxide between the first metallized layer 2 and the metal oxide dielectric 3, if the latter is made of titanium dioxide.

Figure 3:
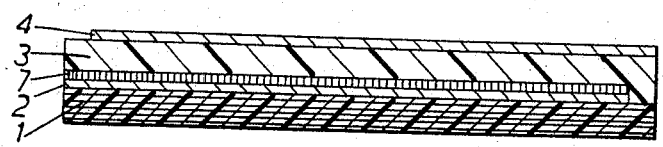

The cross-secion of the fully processed plastic support sheet and layers is illustrated in FIG. 3, wherein the same numerical references as in FIG. 1 are used. The manganese dioxide layer is indicated at 7. The manganese dioxide layer is produced either by pyrolysis of manganous nitrate or by cathodic reduction of a permanganate.

While the prinicples of the present invention have been described in relation to a specific embodiment, it will be clearly understood that this has been made only be way of example and does not limit the scope of this invention as set forth in the appended claims.

What is claimed is:

1. A wound capacitor comprising an insulating support layer, a first metallized electrode layer on said support layer, a manganese dioxide layer on said first electrode layer, a metal oxide dielectric layer on said manganese dioxide layer, and a second metallized electrode layer on said metal oxide dielectric layer, said metal oxide dielectric layer being an oxide of a metal other than that of the metal of said second electrode layer.

2. The capacitor of claim 1 wherein the thickness of the metal oxide dielectric layer is equal to $V/\sigma$, wherein V is the maximum capacitor operating voltage and $\sigma$ is the dielectric strength in volts per unit of thickness of the material of the said layer.

3. The capacitor of claim 1 wherein the metal oxide dielectric layer is of a material of the group consisting of titanium dioxide, niobium oxide, zirconium oxide, tantalum oxide, aluminum oxide and hafnium oxide.

4. The capacitor of claim 3 wherein the electrode layers are of aluminum.

5. The capacitor of claim 3 wherein the insulating support layer is of a material of the group consisting of polyimide, polytetrafluorethylene, polyhydantoin, polysulfone, poly-4-methyl-pentene, ethylene polytherephtalate, polypropylene and polycarbonate.

6. The capacitor of claim 3 wherein said metal oxide dielectric layer is titanium dioxide.

7. The capacitor of claim 3 wherein said first electrode layer is spaced from one end of said wound capacitor and said second electrode layer is spaced from the other end, said capacitor including a plurality of wound layers of said insulation support, first metallized electrode, first metal oxide, metal oxide dielectric and second metallized electrode, and a pair of metal end coatings connecting respective alternate first and second spaced electrode layers on each end together to provide leads thereto.

* * * * *